A. F. CALLISON.
LOADING AND UNLOADING MEANS AND PORTABLE BODY FOR TRUCKS.
APPLICATION FILED DEC. 24, 1920.
1,422,663.
Patented July 11, 1922.
4 SHEETS—SHEET 2.
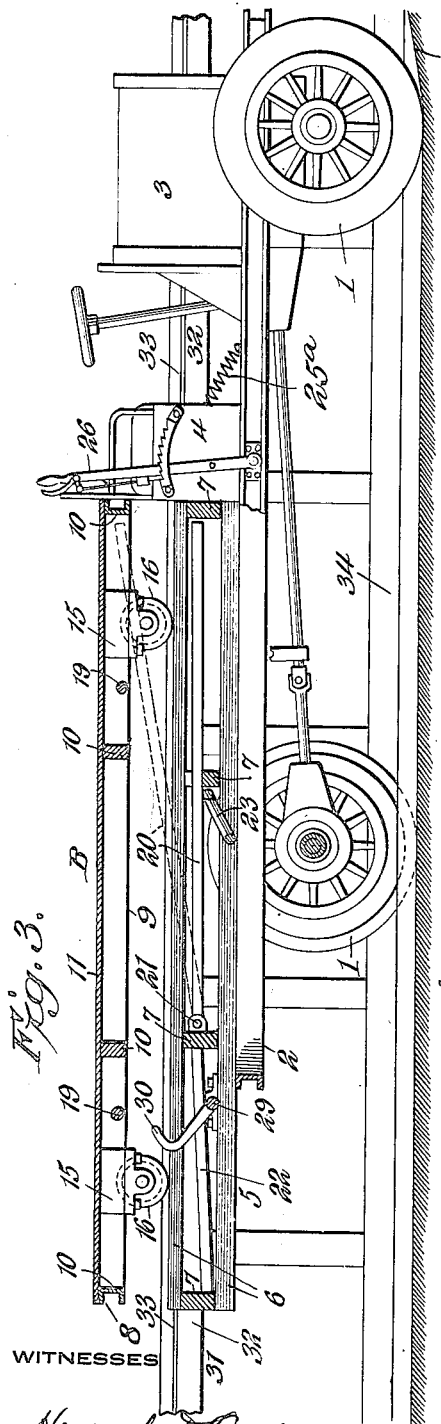
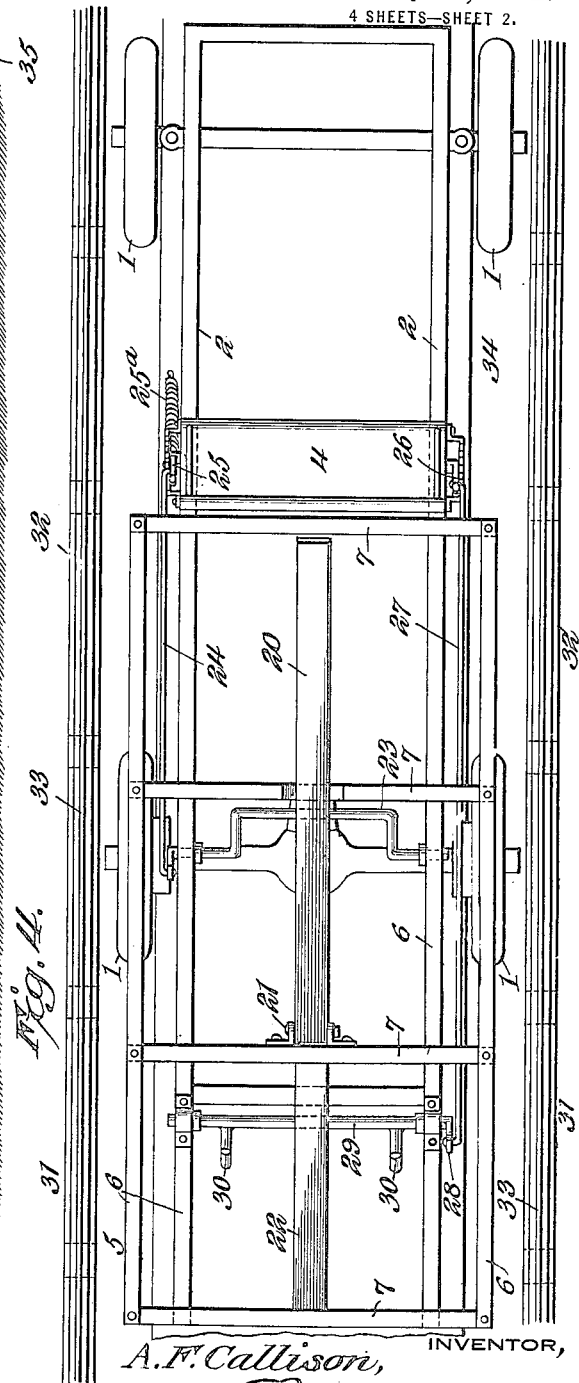

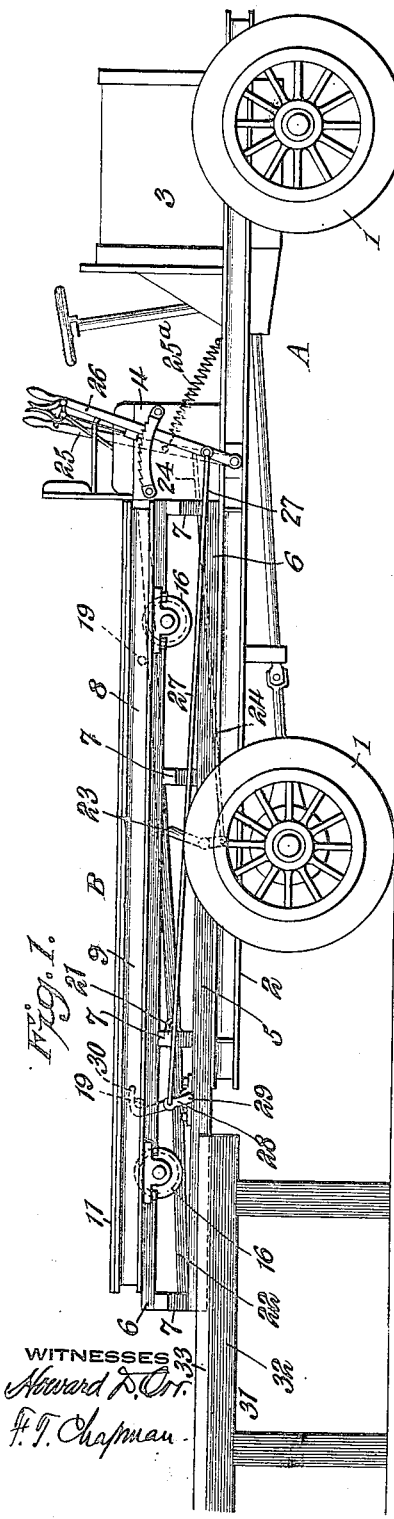
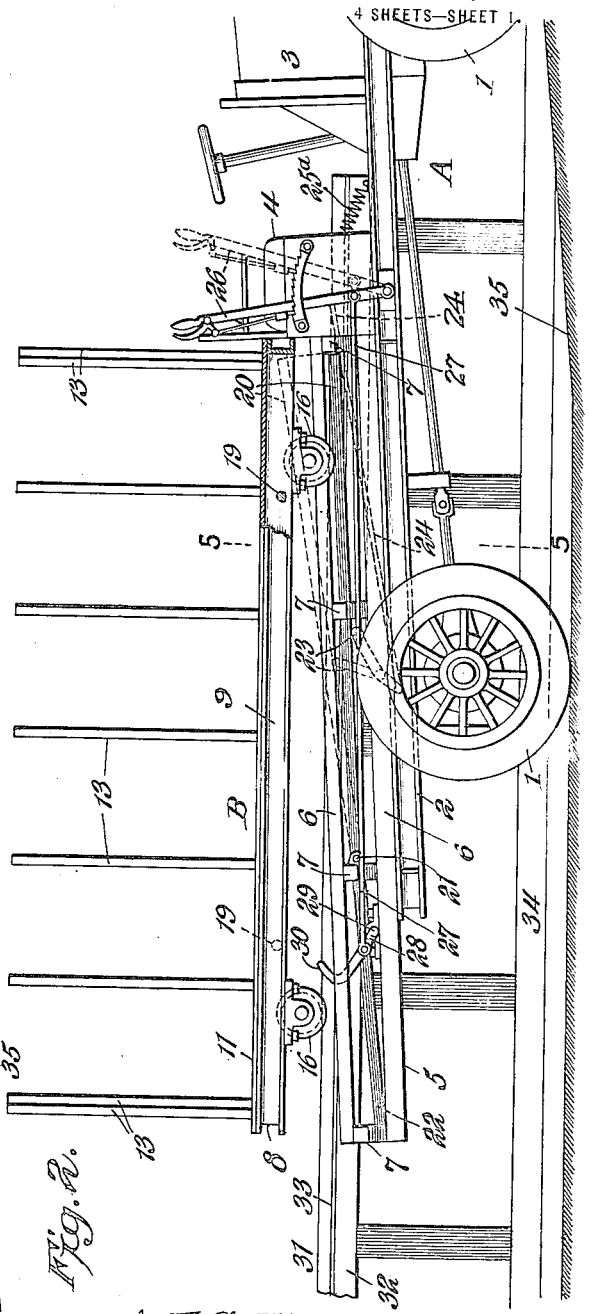

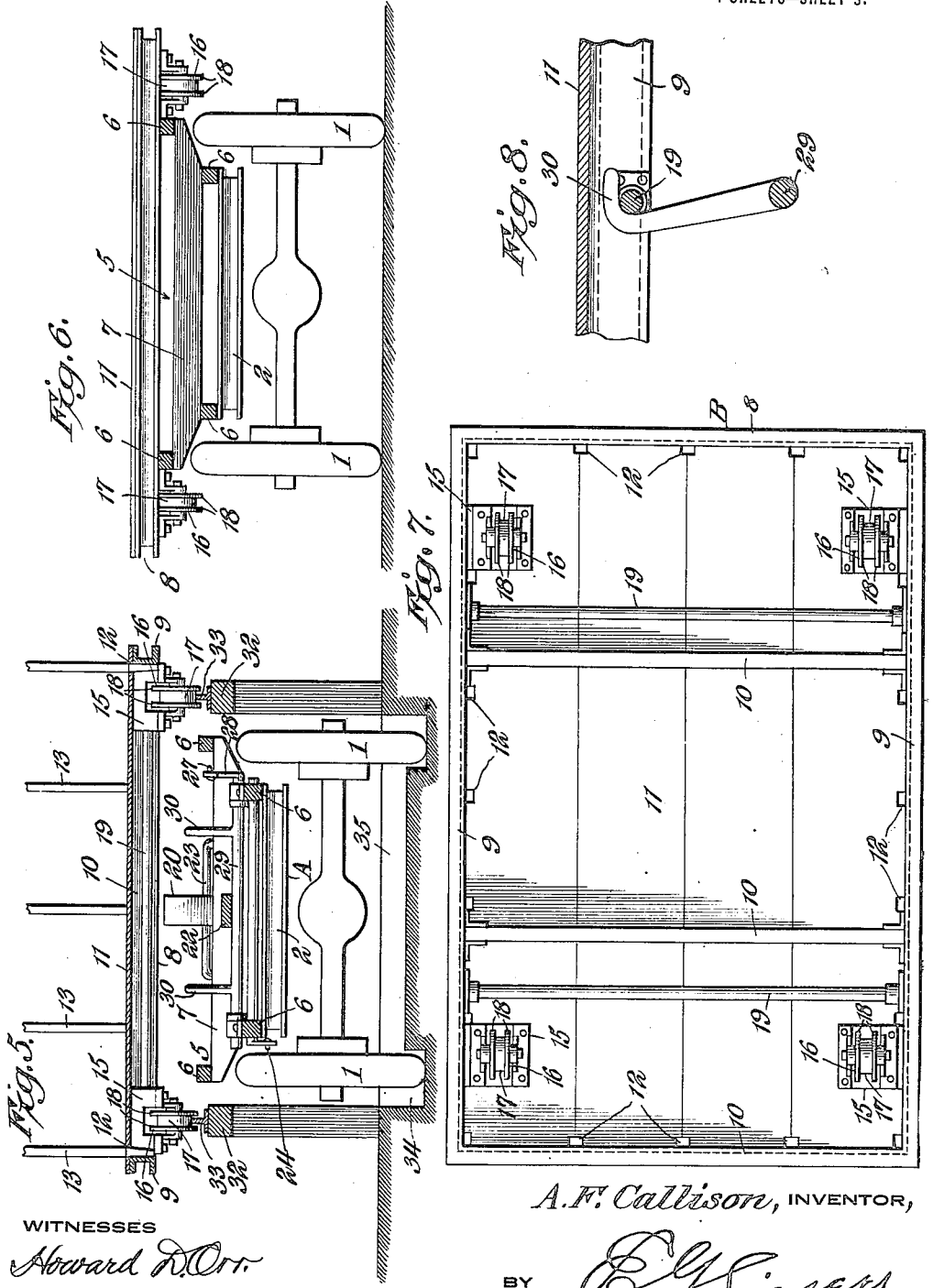

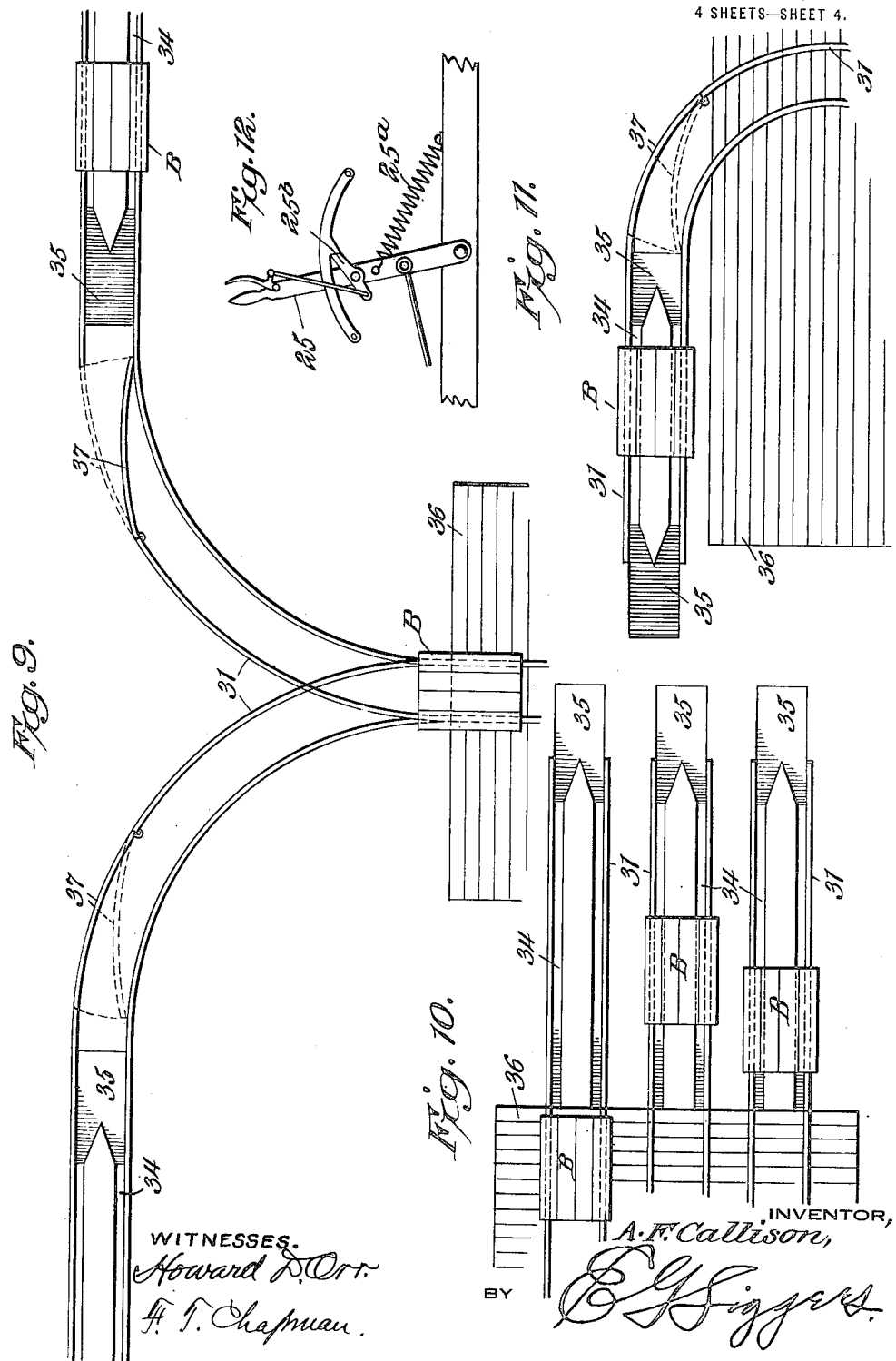

UNITED STATES PATENT OFFICE.

ABNER F. CALLISON, OF BUFFALO CREEK, COLORADO.

LOADING AND UNLOADING MEANS AND PORTABLE BODY FOR TRUCKS.

1,422,663. Specification of Letters Patent. Patented July 11, 1922.

Application filed December 24, 1920. Serial No. 432,982.

*To all whom it may concern:*

Be it known that I, ABNER F. CALLISON, a citizen of the United States, residing at Buffalo Creek, in the county of Jefferson and State of Colorado, have invented a new and useful Improvement in Loading and Unloading Means and Portable Bodies for Trucks, of which the following is a specification.

This invention has reference to loading and unloading means and portable body for trucks and its object is to provide a simple construction for the purpose, whereby loading and unloading of separate truck bodies upon automobiles or other vehicles is greatly facilitated.

In accordance with the invention, the operator of the vehicle may load or unload the movable bodies without the necessity of leaving his seat. The removable bodies are mounted upon wheels whereby the bodies may be moved about a depot or warehouse or other place of storage and, when mounted on the vehicle, rest upon their bottoms or beams and not upon their wheels. Provision is made for removing the truck from the body member of the vehicle before the vehicle need come to a stop.

The truck and body member of the vehicle are readily attached together without the necessity of the operator leaving his seat and the vehicle with the body attached may be immediately driven away, thus realizing the greatest possible speed in these operations.

The invention will be best understood from a consideration of the following detailed description, taken in connection with the accompanying drawings forming part of this specification, with the understanding, however, that the invention is not confined to any strict conformity with the showing of the drawings, but may be changed and modified so long as such changes and modifications mark no material departure from the salient features of the invention as expressed in the appended claims.

In the drawings :—

Figure 1 is a side elevation of an automobile chassis with the removable body thereon and approaching the receiving tracks for the body, whereby the latter is automatically deposited on the tracks, permitting the immediate withdrawal of the chassis of the vehicle.

Fig. 2 is a view similar to Fig. 1 but showing the parts with the removable body deposited on the receiving tracks and the chassis released for withdrawal.

Fig. 3 is a longitudinal vertical section, with some parts in elevation, through the structure shown in Fig. 2.

Fig. 4 is a plan view of the chassis part of the automobile with the body removed.

Fig. 5 is a cross section on the line 5—5 of Fig. 2.

Fig. 6 is a cross section similar to that of Fig. 5, but showing the chassis and body removed from the trackage.

Fig. 7 is a bottom plan view of the removable truck body.

Fig. 8 is a detail view of one of the body holding hooks in holding position.

Fig. 9 is a diagrammatic plan view of one form of trackage at a warehouse or depot, for facilitating the use of the invention.

Fig. 10 is a diagrammatic plan view of another form of trackage.

Fig. 11 is a diagrammatic plan view of still another form of trackage.

Fig. 12 is a detail of a latch lever for the operator's use.

Referring to the drawings, and particularly to Figures 1 to 8, there is shown an automobile chassis A of the truck type, comprising wheels 1, a chassis frame 2, an engine 3, a driver's seat 4, a frame 5 composed of longitudinal beams 6 and cross beams or bolsters 7, and certain other parts to be described, the supporting truck being of any suitable type.

Adapted to the truck chassis is a truck body or platform B, comprising a frame 8 made up of longitudinal side beams 9 and cross beams 10 and a flooring 11, with a series of sockets 12 near the margins of the platform for receiving stakes 13, such as are customarily used in connection with motor trucks for hauling different commodities or the like. The chassis A, provided at suitable intervals with the bolsters 7, is of an appropriate size to underride the beams 8 and 10 of the body B so as to uphold the latter and whatever load may be thereon. Near the corner portions of the body B on the under face thereof are journal blocks 15, each having a wheel or roller 16 mounted therein, these rollers 16 each having a peripheral groove 17 bordered by flanges 18 having flat edges so that the rollers will bear upon a suitable supporting surface, such as a flooring, to roll thereon from one position to another without damage to the flooring. Near the ends the body B is traversed by rods or bars 19 firmly mounted in the side beams 9 of the body, adjacent to the ends thereof.

The running member or chassis of the truck is provided with a longitudinal push bar or pusher 20 having a pivot connection 21 at one end to a bolster 7. In order to reinforce the cross member or bolster 7 to which the pusher 20 is pivoted, a brace 22 is secured to the bolster 7 carrying the pusher 20 and to another bolster 7 to the rear thereof.

Journaled in the side bars of the frame 5 is a crank shaft 23 having its crank portion underriding the pusher 20 at a distance from the pivot connection 21 so that on turning the crank shaft 23 to a suitable extent, it will engage under the pusher 20 and lift the free end thereof high enough to be brought into the path of one end beam 10 of the body B, and when the crank shaft 23 is moved in the other direction the free end of the pusher 20 will be lowered out of the path of the truck body B. The crank shaft 23 is connected by a reach rod 24, to a latch lever 25 at one side of the driver's seat 4 and under the control of a spring 25$^a$ tending to move the lever in one direction, whereby the driver, without leaving his seat, may lift or lower the pusher 20 at will. The lever 25 is locked with the spring 25$^a$ extended, by means of a dog 25$^b$ (see Fig. 12).

At the driver's seat there is provided another latch lever 26 connected by a reach rod 27 to a crank arm 28 on a rock shaft 29 journaled at the ends in the frame 5. The rock shaft 29 carries spaced hooks 30 in position and shaped to engage over the rod 19 to lock the truck body B to the chassis A when the parts are in appropriate position (see Fig. 8).

In Figure 9 and also in other figures of the drawings, there is shown trackage 31 comprising elevated supports 32 carrying track rails 33 suitably gaged to receive the rollers 16 of the body B. Between the tracks, but at a suitably lower level, there are guide grooves 34 having depressed approaches 35, the grooves and approaches being suitably gaged to accommodate the wheels 1 of the chassis A.

The trackage 31 may terminate at or lead onto a platform 36 representing the floor of a warehouse or other place of storage or transfer of goods or commodities as represented in Figures 9, 10 and 11.

When a truck with a removable body B is moved to some chosen point where trackage occurs, it is directed into grooves 34 associated with and below the trackage so that the rollers 16 on the body engage the tracks 33 and pass thereupon. While the structure is of such character that the removable body member B carried by the truck may pass upon the tracks in either direction, it may, for convenience of description, be considered that the automobile is backing into the trackage in Fig. 1. The parts are so proportioned that, under the circumstances assumed, with the car being backed the rear rollers of the body pass upon the track rails 33, as the rear wheels of the automobile move down the approaches 35, so that the rear portion of the chassis drops with relation to the track rails engaging the rear wheels of the body. Before this occurs, the operator, by moving the control lever 26, rocks the shaft 29 to an extent sufficient to disconnect the hooks 30 from the rod or bar 19, thus permitting the body to remain in the elevated position on the tracks, while the chassis drops away from the body. The continued movement of the chassis, causes the travel of the body along the track until the body has been sufficiently advanced along the elevated track to give clearance between the body and chassis to permit the chassis to be reversed in its direction of travel so as to run from under the released body, in order that the chassis may leave the body and be moved to another position where it may engage a second loaded body while the first body is being unloaded, at which time the first body may be readily moved along the track supporting it or over the floor of the warehouse to a position where it may be unloaded and reloaded.

In order to couple a loaded body to the chassis, the dog 25$^b$ of the lever 25 is released, thereby allowing the spring 25$^a$ to lift the pusher 20 to its highest point. The chassis is then backed under a previously loaded body on the elevated track until it engages such body. The pusher automatically snaps behind the front cross beam 10 of the body B, this being accomplished while the front wheels of the chassis part of the automobile are still in the guiding grooves 34 before these front wheels have reached the rising approaches 35. The automobile is now moved forwardly toward the approaches when the front wheels are lifted by said approaches and the forward bolsters 7 of the frame 5 rise under the beams of the body member B first lifting the forward rollers 16 from the tracks 33 and ultimately lifting the rear rollers from the tracks 33. When this has been accomplished and the chassis has left the track grooves 34, the control lever 26 is manipulated to move the hooks 30 into engagement with the cross rod 19, so that the body is securely fastened to the chassis against accidental disconnection therefrom, the pusher 20 having been lowered by the rising of the chassis under the body B and causing the lever 25 to move back and latch. As the chassis rises due to its upward progress in the slanting runway, the movable body and the chassis approach each other, whereby the pusher rod 20 will be depressed by the movable body towards the chassis and depress the crank 23, operating the rod 24 and the lever 25 against the tension of the spring 25$^a$.

In the arrangement shown in Figure 9 the track 31 has gates 37 therein pivoted so that a section of the track is large enough to permit the automobile chassis with or without the body to move into and out of the line of track. The figure may be considered as showing a body B to have been left upon the track with another body B left on a warehouse platform 36 with the latter body ready for removal or the reverse of these conditions may be considered. Again, it may be considered that the truck with the body thereon may have entered the track at the left hand side of Figure 9, the gate 37 of the track opened, and the chassis may have moved out and be entirely free from the track to move through the open gate 37 at the right hand end of the track to receive the body B at such right hand end of the track. The showing of Figure 9 will indicate various ways of loading and unloading bodies from the chassis.

Figure 10 is a showing of a more elaborate equipment where numerous tracks are provided for loading and unloading without interference. Figure 11 is a view of trackage similar to the left hand end of Figure 9 but without the showing of the right hand end thereof, the indication being that of the leaving of the body at a warehouse with the chassis relieved from the body and assumed to have departed, and with the track ready for the pushing of the body into the warehouse or a loaded body moved into position to be engaged by the chassis entering the track through the open gate 37, the open position of the gate being indicated in dotted lines.

There are locations, say at freight depots and docks, whereby the space is limited and the platforms stand up from the ground about four feet or more, while the space below the platform is of no use except to provide room for supports for the platform.

By excavating underneath the platform, and for the entire length of the latter, a driveway about ten feet wide, the truck may be driven in at one end and out of the other end. This permits taking a body from the truck or chassis at one end and taking a body on at the other end.

The arrangement does not necessitate any stop going in, for in actual practice a speed of from four to six miles per hour may be maintained and, at the other end, when taking on another body a stop, not to exceed about ten seconds, is all that is necessary.

What is claimed is:—

1. A removable-body truck comprising a vehicle, and a removable body carried thereby, in combination with a track or support for the removable body, and a depressed runway for the vehicle below the track, whereby the body is automatically lifted from the vehicle by the support when the vehicle is progressively moved along the runway.

2. A removable-body truck comprising a vehicle, a removable body with supporting wheels and adapted to be carried by the vehicle, a track or support for the body separate from the vehicle, and a runway for the vehicle depressed with relation to the support, whereby the wheels of the removable body are adapted to carry said body on the support as the vehicle is progressively moved along the runway.

3. A removable body truck comprising a vehicle, having supporting wheels and a frame thereon, a body provided with wheels and adapted to the frame on the vehicle, a track for receiving the body, and a sunken or depressed runway, said vehicle being adapted to move along the runway whereby the vehicle may be caused to drop away from the body while the track receives and supports the movable body.

4. A removable-body truck comprising an automobile chassis, with a frame thereon, a body, having wheels, and adapted to the frame on the chassis, a track on which the body may be moved, and a runway for the chassis below the track and sunken or depressed to a greater extent than the height of the chassis, said chassis adapted to be progressively moved along the runway, whereby the body may be deposited on the track at a greater elevation with respect to the chassis than it occupies when sustained by the chassis.

5. A removable-body truck comprising an automobile chassis having a frame thereon, a removable body having wheels, and adapted to the frame on the chassis, a track on which the removable body may be run, a sunken or depressed runway below the runway for permitting the chassis to approach the body when said chassis is moving along the track, means on the chassis for automatically engaging the body to transfer it from the track onto the chassis by the travel of the latter, and means under the control of an operator on the chassis for coupling the body member and chassis together, while the chassis is moving.

6. A removable-body truck comprising an automobile chassis, a removable body member adapted to be carried by the chassis, a support for the body member upon which it may be deposited by the travel of the chassis, means on the chassis and movable by the body member into engagement with said body member for transferring the body member from the support onto the chassis by the travel of the chassis, and means for locking the body member and chassis together with the body member sustained by the chassis.

7. A removable-body truck comprising an automobile chassis with a frame thereon, a body member having sustaining wheels, adapted to the frame on the chassis, a track for receiving the removable body from the chassis, an oscillatable pusher on the chassis for engaging the removable body and transferring the same from the track to the chassis, and means for locking the removable body to the chassis when transferred thereonto.

8. A removable-body truck comprising an automobile chassis, a body member movable onto and from the chassis, a pusher on the chassis under the control of the driver of the truck for transferring the body member onto the chassis by the travel of the latter, and locking means for connecting the body member to the chassis and also under the control of the driver of the chassis, the means under the control of the driver comprising latch levers arranged at opposite ends of the seat occupied by the driver.

9. A removable-body truck comprising an automobile chassis, a body member adaptable to and removable from the chassis, a pusher on the chassis for causing the transfer of the body member onto the chassis, said pusher being hinged or pivoted at the rear end with the forward end free to be moved into engagement with the body member, and means under the control of the operator of the chassis to elevate and lower the pusher about its pivoted or hinged connection.

10. A removable-body truck comprising an automobile chassis, a removable body member adapted to be carried by the chassis, means carried by the chassis and movable independently of the chassis to engage with the body member to cause simultaneous travel of the body member with the chassis, and locking means on the chassis for engaging the body member to hold it to the chassis when the body member is carried by the chassis.

11. A removable-body truck comprising an automobile chassis and a body adapted to rest upon and be carried by the chassis, means for locking the body on the chassis and under the control of an operator located in the operator's seat, a track in the path of the truck with a depressed runway for the chassis to cause it to drop away from the body member when upon the track, and means under the control of the operator on the chassis for locking the removable body to the chassis when carried by the latter.

12. A removable-body truck comprising an automobile chassis, a body member adapted to rest upon the chassis, a rock shaft on the chassis provided with hooks participating in the rocking movements of the shaft, a bar on the body member in the path of the hooks, and means under the control of the operator of the vehicle for rocking the shaft to move the hooks into and out of engagement with the bar.

13. A removable-body truck, comprising an automobile chassis, a removable body member adapted to be carried by the chassis, a support for the body member upon which it may be deposited by the chassis, and automatic movable means on the chassis for engaging and transferring the body member from the support onto the chassis.

14. A removable-body truck, comprising an automobile chassis, a body member adapted to be carried by the chassis, a support for the body member upon which it may be deposited by the chassis, and automatic pushing means on the chassis for engaging and transferring the body member from the support onto the chassis, said automatic means having means under the control of an operator for disengaging said pushing means to release the body member from the chassis.

15. A removable-body truck, comprising an automobile chassis with a frame thereon, a body member having sustaining wheels, adapted to the frame on the chassis, a track for receiving the removable body from the chassis, a pusher on the chassis for engaging the removable body member for transferring it from the track to the chassis, means for setting the pusher to automatically engage the body member to cause the transfer, and means for locking the removable body to the chassis or for releasing it therefrom at the will of the operator.

16. A removable-body truck, comprising an automobile chassis, a body member movable onto and from the chassis, a pusher on the chassis under the control of the driver or operator of the truck for transferring the body member onto the chassis by the travel of the latter, and locking means for connecting the body member to the chassis and under the control of the driver of the chassis, the pusher operating means of the chassis, and the locking means being provided with latch levers located at opposite ends of the seat occupied by the driver with the lever controlling the pusher provided with a spring imparting to it a normal tendency in one direction, and a latch for holding the spring in opposition to its normal tendency.

17. A removable-body truck, comprising an automobile chassis, a body member adapted to be carried by the chassis, a support for the body member upon which it may be deposited by the chassis, means on the chassis for engaging and transferring the body member by the travel of the chassis from the support onto the chassis, a spring for imparting to the last named means a normal tendency toward the engaging position, and means under the control of the operator of the vehicle for holding the pushing means in the inoperative position.

In testimony that I claim the foregoing as my own, I have hereto affixed my signature.

ABNER F. CALLISON.